Figure 1:
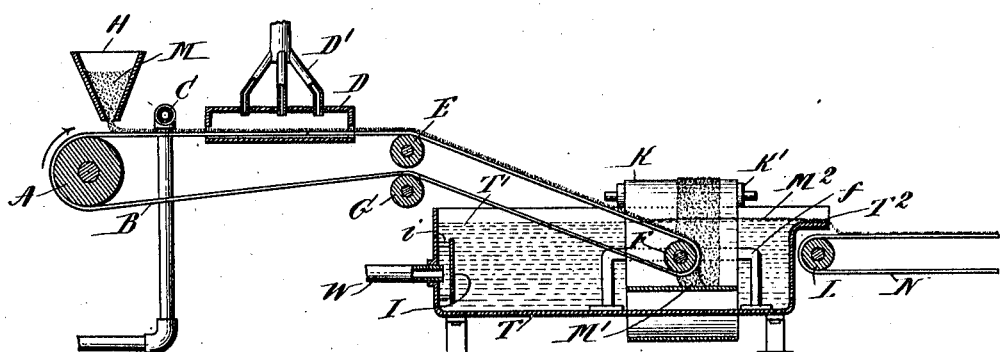

H. A. WENTWORTH.
PROCESS OF SEPARATION.
APPLICATION FILED MAR. 11, 1910.

980,035.

Patented Dec. 27, 1910.

WITNESSES:

INVENTOR:

UNITED STATES PATENT OFFICE.

HENRY A. WENTWORTH, OF NEWTON, MASSACHUSETTS, ASSIGNOR TO HUFF ELECTROSTATIC SEPARATOR COMPANY, OF BOSTON, MASSACHUSETTS, A CORPORATION OF MAINE.

PROCESS OF SEPARATION.

980,035.   Specification of Letters Patent.   Patented Dec. 27, 1910.

Original application filed August 18, 1908, Serial No. 449,058. Divided and this application filed March 11, 1910. Serial No. 548,730.

*To all whom it may concern:*

Be it known that I, HENRY A. WENTWORTH, a citizen of the United States, and resident of Newton, in the county of Middlesex and State of Massachusetts, have invented new and useful Improvements in Processes of Separation, of which the following is a specification.

My invention relates to the concentration or separation of the ingredients of mixed solid material, comminuted as by granulation, such as in the crushed rock, or earth which bears valuable minerals or ores and from which it is necessary or desirable to separate the commercially valuable materials from the inferior ingredients, all of which may possess commercial value when segregated, but which, when mingled, interfere mutually with processes, such as smelting, which for their best results require comparatively pure materials to work upon.

My new process herein described and claimed constitutes a specific aspect of a process shown, described and claimed in an application for Letters Patent of the United States, filed by me August 18, 1908, and serially numbered 449,058, of which this application is a division.

The process in its general aspect involves the treatment of a mixed heterogeneous mass of particles by, or its subjection to, a reagent which enters into chemical combination with the substance of the particles themselves, or with that of some particles as distinguished from others, to an extent sufficient to form upon the surfaces of the affected particles, compounds which differ in constitution both from the reagent and the original particles, and which exhibit in contact with a liquid a degree of avidity for the liquid different from that possessed by such solid particles when unaffected or not prepared by such reactive treatment. By causing a chemical change to take place in one or more of the ingredients of which the particles of the mixture are composed, so that some particles are, to a substantial extent changed superficially at least, differential behavior of the changed and unchanged particles in respect to susceptibility to contact with a liquid is produced, or enhanced. By means of this differential quality, the effects of liquid adhesion, surface-tension, and kindred phenomena may be availed of to produce a separation of one class of particles from others.

In its specific aspect, to which the present specification is addressed, the process involves a treatment of the mixed mass of particles by such a chemical reagent as enters into combination with some of the particles to produce thereon superficial coatings of a compound or substance more susceptible of wetting by, or, having a greater avidity for, a liquid, than the original unaffected substance of those particles. After such preparatory chemical treatment, the mass is subjected to any mode of flotation-separation in which the said liquid is functional. Other particles may remain unaffected by the chemical reagent which produces the change on the affected particles in respect to their behavior toward a liquid, or other particles may be affected, but in the contrary manner, that is to say, may have formed upon their surfaces compounds or substances less susceptible to wetting by, or having less avidity for, the liquid, than the said particles before treatment. In any case, the treatment which renders the surfaces of some particles more susceptible to wetting by a liquid than were these particles originally, produces a wider divergence between ingredients of the mixture in respect to behavior toward, or in the presence of, a liquid, than existed prior to the chemical treatment. Thus, mixtures which in their ordinary condition are not readily susceptible to flotation-separation are made susceptible by preliminary chemical treatment, which produces superficial differences or increases superficial differences, as between ingredients of the mixture, in respect to wetting, or film-tension, of a selected liquid. But the specific mode by which differential avidity for a liquid (as the term is defined hereinabove) may be availed of for separation does not necessarily involve the deposition of material upon the surface of a body of liquid, but may be functionally useful in any of the known modes of separation wherein liquid film tension and flotation are characteristic factors. When, however, the surface of a particle is chemically treated so that the superficially imposed compound or substance is more susceptible to wetting by a liquid than was the particle originally, i. e. invites, or is more amenable to, the action termed "film tension", then the liquid, responding to this new condition on the surface of the particle, clings to it. Thus, the production of a superficial compound on a particle, which possesses greater avidity for the liquid than the original substance of the particle, will, by contrast with particles not so affected, or if affected, rendered less susceptible to wetting than normally, facilitate flotation separation, in whatever manner liquid film tension may be availed of for flotation separations.

Particularly my new process generally outlined above is applicable to the case of sulfids, and to mixtures which contain several sulfids, as for instance, zinc sulfid and iron sulfid. The reagent employed in the case of such sulfid mixtures is a halogen, preferably chlorin. While fluorin or iodin may be technically effectual, their employment presents practical obstacles; bromin, while more available than these two, is less easily obtained than chlorin, the most common representative of the halogen class.

Whatever may be the specific exemplification of the preparatory treatment above generally characterized, it is to be followed by the presentation of the mass after preparation to conditions favorable to the operation of film or surface tension, as at the surface of a liquid, (according to the specific illustration hereinbelow set forth) so that the film or surface tension thereof sustains some particles, while others are wetted and engulfed.

My process herein described, unlike those with which I am acquainted or of which I have been informed, is characterized by a reaction between the substance of particles in a mixture, and a reagent to which the mixture is subjected, which forms on the surfaces of the particles, films or coatings, different in chemical composition from either the reagent or the particles reacted on—(because a compound of the two) which film or coating is distinct from the original particle in respect to its behavior toward a liquid, which either is more susceptible to being wetted by a liquid than was the particle itself before treatment. After this characteristic preparation of the ingredients of a mixture, the subsequent application of liquid surface tension agencies, for the purpose of separation of one ingredient from another, need not differ in any material respect from well known flotation processes of separation.

Figure 2:
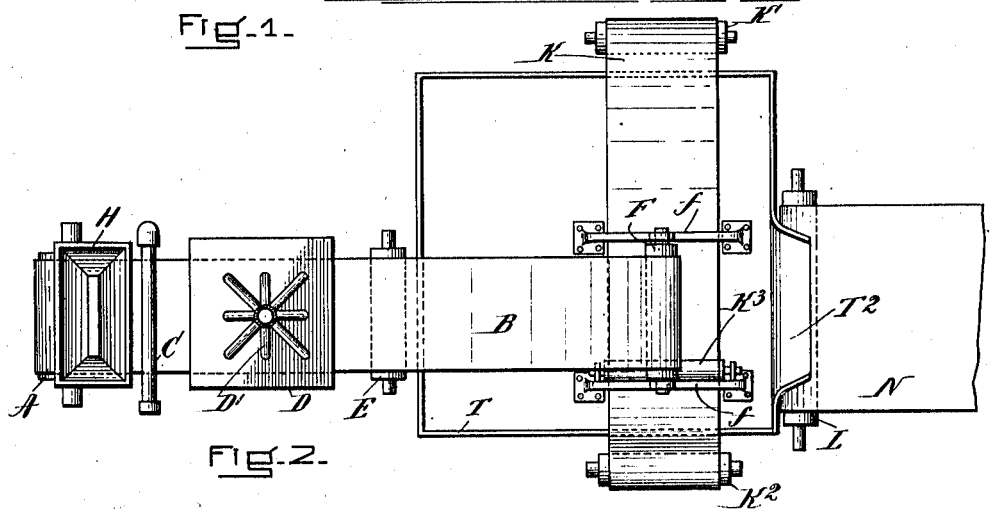
Figure 3:
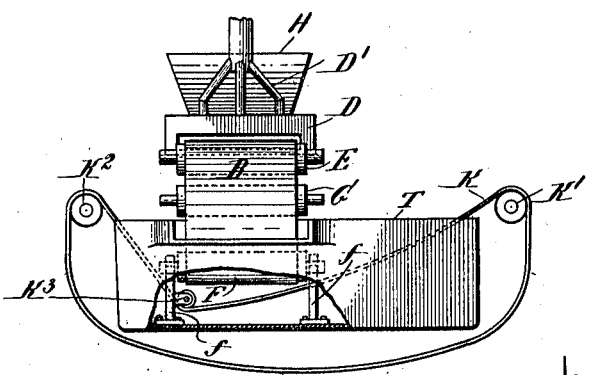

In the drawings hereto annexed there is illustrated an apparatus suited to the performance of my new separative process; in these Figure 1 represents a longitudinal elevation, partly in section, of the apparatus; Fig. 2 shows the same apparatus in plan view; and Fig. 3 shows the apparatus in front elevation partly broken away and partly in section. In these figures the major part of the supporting frame work is not shown.

An endless belt B, which may be a canvas belt, is carried over a driving roller A, guide rollers, E, E, and G, under a sprinkling pipe C and through a box D. From the guide roller E the belt B dips beneath the surface T' of water in the tank T, and returns around the roller F lying beneath the surface of the water, supported upon a frame $f$; and thence to the lower guide roller G to the roller A; a hopper H serves to deliver the ore or other mixture, M, (in properly comminuted condition) to the surface of the belt B which travels in the direction indicated by the arrow at the roller A. Water is conducted into the tank T in a gentle stream from the pipe W; this stream impinges against the surface of a baffle plate I which is mounted upon the side of the tank on legs $i$. At the side of the tank opposite the pipe W is provided the projecting lip $T^2$; below this lip there is mounted a belt N passing over and driven by a roller L. Within the tank and extending at right angles to the belt B, the belt K travels under the guide roller $K^3$ over the external guide rollers $K'$ and $K^2$, passing beneath the tank T in its return movement. Pipes D' lead into the upper portion of the box D through which the belt B passes in its movement from the hopper H to the tank T. If now, for example, a mixture such as is found in a number of so-called blackjack zinc ores, be delivered to the belt B from the hopper H, this mixture containing, say, zinc-iron sulfid with a proportion of iron sulfid dissociated from the zinc sulfid, lead sulfid, perhaps copper sulfid and a silicious gangue, it will be spread upon the belt B by the movement thereof and carried under the sprinkling pipe C which delivers through suitable apertures a stream of water sufficiently copious to moisten the mineral mixture thoroughly and yet not sufficiently copious to wash the same off the belt. Thence the material passes with the belt into the box D. Meanwhile a stream of halogen, preferably chlorin, is introduced into the box through the pipes D' so that the moist material is sufficiently chlorinated, during its passage through the box. The material thus treated with a halogen passes with the belt from the box D down to the liquid in the tank T; this liquid is preferably water. The chlorin evidently reacts upon both the zinc sulfid and iron sulfid, but with strikingly different results. The preliminary application of water, as from the pipe C, promotes the reactions, which would hardly take place were the solid materials dry. If the mixture is fairly comminuted, enough water may be carried by the belt itself to effect this useful preliminary moistening of the particles.

The chlorin undoubtedly goes into a concentrated solution in the water-films which cling to the particles, and is thus brought into intimate reactive contact with the substance of the particles themselves. Examination of zinc sulfid particles thus treated discloses coats, films, or blotches, of an oily appearing compound, which is probably a chlorin of sulfur, and these coats or blotches, constitutionally different from either the zinc sulfid or the chlorin,—because a resultant compound of both,—render the particles which bear them decidedly averse to becoming wetted by water; far more so than the zinc sulfid particle itself before treatment. Particles of zinc sulfid of such size that they would, in their natural condition although dry overcome the surface tension of a body of water and sink therein, will after a halogen treatment, be sustained upon the surface of the liquid. With iron sulfid, on the contrary, the effect of the halogen upon the surface of the solid material appears and is believed to be the formation of a halogen compound, probably with the iron itself, which is very readily soluble in water, or at all events, manifests decided avidity for water, so that iron sulfid upon coming in contact with the water is more readily wetted, seems to attract rather than to repel the water, and so that the surface tension of the liquid is overcome even more quickly than will be the case with iron sulfid in its ordinary condition. This may be demonstrated by taking finely comminuted iron sulfid, whereof the dimensions of the particles are so small that ordinarily they would float freely upon the surface of the water. If these be superficially treated with the halogen, especially in association with moisture and then placed upon the surface of the water, they are promptly engulfed and settle in the liquid. At the point where the belt B enters the water in the tank T, the zinc sulfid will be floated off upon the surface of the water, while the other components of the material are submerged and fall from the belt B as it turns on the roller F, and settle upon the belt K. The flow of liquid in the tank out over the lip T² carries with it the scum of finely comminuted floating zinc sulfid together with zinc sulfid particles of considerable size, all of which are floated by the surface tension of the water, and escape over the lip T² upon the belt N from which they may be collected. The other components of the material are carried by the movement of the belt K out of the tank and may be deposited in any suitable receptacle or conveyed away by any suitable means.

As a further illustration of the value of my above described process, if one takes a comminuted ore containing chalcopyrite and iron pyrite, the behavior of the ingredients is as follows: In the preliminary process of comminution, the chalcopyrite breaks up into thin scales which, without any further treatment, float easily upon the water: this propensity for floating has heretofore proved troublesome in the use of water tables in which it is difficult to prevent the escape and loss of fine particles of chalcopyrite. Moreover, the fine particles of iron pyrite if placed in water without any previous treatment float substantially as readily and freely as the chalcopyrite flakes, and separation by this means is thereby defeated. If we now subject such a mixture to the chemical influence of a halogen in the manner above described, the halogen reacts promptly upon the iron pyrite and much more slowly or not at all upon the chalcopyrite, thus leaving the chalcopyrite particles practically in their natural condition, but so converting or affecting the surfaces of the iron pyrite particles that they possess an unusual avidity for water. Then, when the mixture is introduced into a tank containing water the chalcopyrite particles are separated from the iron pyrite because of the natural tendency of the former to float, (that is to say, to be sustained by the surface tension of the water) and the artificially produced tendency of the latter to become superficially coated or wetted with the water. A similar behavior of the particles for the same reason, will be observed if the mixture is introduced directly, and without preliminary treatment, into water containing a halogen in solution; then the halogen treatment and the differential flotation and immersion effects are substantially simultaneous. In treating ores of the last named character, it is advisable to limit the halogen treatment either by abbreviating the time during which the mixture is in the presence of the halogen or by attenuating the halogen as by solution so that the chalcopyrite does not have sufficient opportunity to become affected, which might be the case if the treatment were vigorous or protracted.

When an apparatus such as above described is employed, the "body" of water upon the belt conveyer is in effect a continuation of that more apparent "body" of water in the tank. Whenever the preparatory reaction is practically instantaneous, the material need not be supported as by a belt after the reaction begins, but may be carried to the liquid surface, prepared for flotation at the first touch of the reagent suspended in solution in the liquid, and be floated (or immersed) at apparently the same instant. In other words, when an appreciable time is required to complete the preparatory superficial reaction upon the particles—(or some of them) some mode of support is desirable or necessary to sustain as well as convey the material to the surface of the liquid where the preliminary treatment manifests its functions in the fact of separation by flotation of some and immersion of other particles. That portion of the liquid which is carried by the conveyer will suffice to promote the preliminary reaction, which might, indeed, be effected under the surface of a more copious body of liquid whence the particles might then be mechanically emersed to be again presented to the surface of the liquid, where separation takes place. Preparation of ingredient particles, as herein described, renders the mass susceptible to any flotation separation process wherein film tension plays a functional part.

What I claim and desire to secure by Letters Patent is:

1. The process of separating ingredients of comminuted material, which consists in preparing the material for flotation separation by means of a liquid capable of wetting by prolonged contact all the particles in their normal condition, by associating with the material a substance chemically reactive upon particles thereof, thereby producing upon particles affected by said substance superficial coatings of a compound possessing greater avidity for said liquid than said particles possessed before said treatment, and thereupon directly utilizing the thus produced quality to effect flotation separation of the differentiated particles by association with said liquid.

2. The process of separating ingredients of comminuted material, which consists in preparing the material for flotation separation by means of a liquid capable of wetting by prolonged contact all the particles in their normal condition, by subjecting the material to chemical treatment producing upon part thereof a compound possessing an avidity for said liquid greater than that of the unaffected material, and placing said material into contact with a body of said liquid, wetting and engulfing the particles rendered abnormally susceptible as aforesaid, and subsequently separately collecting the immersed and floated particles of the material.

3. The process of separating zinc sulfid from mixtures of comminuted material which consists in treating the mixture with a halogen, thereby producing on ingredients other than zinc sulfid compounds possessing an abnormal avidity for a liquid, placing the material into contact with a body of said liquid, wetting and engulfing the particles of material rendered abnormally susceptible as aforesaid, and subsequently separately collecting the immersed particles and the floated zinc sulfid.

Signed by me at Boston, Massachusetts this ninth day of March 1910.

HENRY A. WENTWORTH.

Witnesses:
CHARLES D. WOODBERRY,
JOSEPHINE H. RYAN.